United States Patent
Inoue

(10) Patent No.: US 10,535,850 B2
(45) Date of Patent: Jan. 14, 2020

(54) IN-VEHICLE BATTERY PACK

(71) Applicant: TOYOTA JIDOSHA KABUSHIKI KAISHA, Toyota-shi, Aichi-ken (JP)

(72) Inventor: Shigeyuki Inoue, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 126 days.

(21) Appl. No.: 15/796,227

(22) Filed: Oct. 27, 2017

(65) Prior Publication Data
US 2018/0145290 A1    May 24, 2018

(30) Foreign Application Priority Data

Nov. 24, 2016  (JP) .................... 2016-227623

(51) Int. Cl.
*H01M 2/10* (2006.01)

(52) U.S. Cl.
CPC ...... *H01M 2/1077* (2013.01); *H01M 2220/20* (2013.01)

(58) Field of Classification Search
CPC ............... H01M 2/1077; H01M 2220/20
See application file for complete search history.

(56) References Cited

U.S. PATENT DOCUMENTS

| | | | | |
|---|---|---|---|---|
| 2008/0124622 A1* | 5/2008 | Hamada | ............. | H01M 2/1077 429/149 |
| 2008/0193830 A1* | 8/2008 | Buck | ................. | H01M 2/1077 429/120 |
| 2009/0017366 A1* | 1/2009 | Wood | ................. | H01M 2/1061 429/62 |
| 2010/0104927 A1* | 4/2010 | Albright | ............ | H01M 2/0242 429/50 |
| 2012/0003526 A1* | 1/2012 | Kume | ................. | H01M 2/0262 429/151 |
| 2014/0287291 A1* | 9/2014 | Miyawaki | .......... | H01M 2/1077 429/120 |
| 2015/0229010 A1* | 8/2015 | Ahn | .................... | H01M 10/613 429/120 |
| 2016/0260946 A1* | 9/2016 | Ochi | ................... | H01M 10/625 |

FOREIGN PATENT DOCUMENTS

| CN | 203859171 U | * 10/2014 |
|---|---|---|
| JP | 2016-103328 A | 6/2016 |

OTHER PUBLICATIONS

Translation of abstract for CN-203859171-U (Year: 2014).*

* cited by examiner

*Primary Examiner* — Milton I Cano
*Assistant Examiner* — Mary G Henshaw
(74) *Attorney, Agent, or Firm* — Sughrue Mion, PLLC

(57) ABSTRACT

An in-vehicle battery pack includes: battery stacks in which a plurality of battery cells is stacked with a spacer member interposed between the battery cells; a casing in which the battery stacks are housed in two stages in a vertical direction; and an intervening member that is provided between the battery stacks and bottom portions so as to be interposed between a protruding portion protruding to the bottom surface of the battery stack and a wall of the casing.

3 Claims, 7 Drawing Sheets

IN-VEHICLE BATTERY PACK

INCORPORATION BY REFERENCE

The disclosure of Japanese Patent Application No. 2016-227623 filed on Nov. 24, 2016 including the specification, drawings and abstract is incorporated herein by reference in its entirety.

BACKGROUND

1. Technical Field

The present disclosure relates to an in-vehicle battery pack mounted in a hybrid vehicle, an electric vehicle, or the like.

2. Description of Related Art

In the related art, a battery pack is mounted as a power source of a motor for driving an electric motorcar, such as a hybrid vehicle or an electric vehicle. An in-vehicle battery pack generally includes a battery stack having a plurality of battery cells which are stacked and a battery case in which the battery pack is housed.

For example, Japanese Unexamined Patent Application Publication No. 2016-103328 (JP 2016-103328 A) discloses a battery pack including a battery stack that is long in a stacking direction in which a plurality of battery cells is stacked, a device installation plate which is disposed on the top surface of the battery stack and has both side portions attached to both end portions of the battery stack and onto which a device is fixed, and a casing in which the battery stack and the device installation plate are housed and to which both the end portions of the battery stack are attached. In the battery pack, the casing includes a support member that is disposed close to the top surface of the device installation plate at a position corresponding to the center of the battery stack in the longitudinal direction thereof. An elastic member for pressing the battery stack and the device installation plate downward from the top of the battery stack is disposed between the support member and the device installation plate. In the battery pack, since the center of the battery stack in the longitudinal direction is pressed by the elastic member, the resonance frequency of the battery stack increases. Therefore, resonance of the battery pack with respect to the vehicle vibration can be suppressed.

SUMMARY

In the battery pack disclosed in JP 2016-103328 A, vertical vibration of the battery stack can be suppressed. However, in a case where a battery stack is mounted in a vehicle in a state in which the longitudinal direction of the battery stack is the same as a vehicle width direction, it is not sufficient to suppress the vibration of the vehicle in the front and rear direction of the vehicle.

When an external force is applied to the casing at the time of a collision of the vehicle, the battery stack inside the casing may be damaged due to the collision with the inner surface of the casing. This will be described with reference to FIGS. 7 and 8.

As shown in FIG. 7, a battery stack 100 is formed by stacking a number of rectangular battery cells 102. A pair of end plates 104 is provided such that each of the end plates 104 is at each end of the battery stack 100 in a stacking direction X. In an upper portion of the battery stack 100, two binding bands 106 are disposed along the stacking direction X. Although not shown, two binding bands are also disposed in a lower portion of the battery stack 100. Both ends of each of the four binding bands are fixed to the end plates 104. Each binding band 106 applies a compressive load to the stacked battery cells 102 so that the battery stack 100 serves as an integral structure.

Two attachment portions 108 are formed in the lower portion of each end plate 104. As shown in FIG. 7, the battery stack 100 is housed and fixed in a casing 110 by four attachment portions 108 of the end plates 104 at both ends of the battery stack 100. More specifically, the casing 110 includes a pair of side walls 112a, 112b and bottom frames 114a, 114b connected to the respective lower portions of the side walls 112a, 112b at both ends of the casing 110 in the longitudinal direction. In the battery stack 100, the attachment portions 108 of the end plates 104 at both ends are fixed to the bottom frames 114a, 114b of the casing 110 by bolts or the like.

As described above, only the two ends of the battery stack 100 housed and fixed in the casing 110 are fixed to the casing 110, but portions other than both the two ends float with respect to the casing 110. Therefore, in a case where a collision external force is applied to the casing 110 at the time of collision of the vehicle, the collision external force is applied to the attachment portion 108 of the end plate 104, so that the battery stack 100 is bent as shown by the broken line due to stack reaction force (or stack inertial force). Then, the battery stack 100 may collide with the side walls 112a, 112b of the casing 110 to cause damage of the battery cells 102.

The disclosure provides an in-vehicle battery pack capable of suppressing collision interference of a battery stack with side walls of a casing when a collision external force is applied.

An aspect relates to an in-vehicle battery pack including: battery stacks in which a plurality of battery cells is stacked with a spacer member interposed between the battery cells; a casing in which the battery stacks are housed, which includes at least front and rear walls disposed on both sides of the battery stacks along a stacking direction of the battery cells, a bottom portion fixed to lower portions of the front and rear walls, and a ceiling portion fixed to upper portions of the front and rear walls, and at which both end portions of the battery stacks in the stacking direction are fixed to the bottom portion; and an intervening member that is provided between the battery stacks and the bottom portion so as to be interposed between a protruding portion, which is a part of the spacer member protruding to bottom surfaces of the battery stacks, and the front and rear walls of the casing.

According to the configuration described above, the intervening member is provided between the battery stacks and the bottom portion of the casing so as to be interposed between the protruding portion, which is a part of the spacer member protruding to the bottom surfaces of the battery stacks, and the front and rear walls of the casing. Therefore, in a case where the battery stacks are mounted along the stacking direction of the battery stacks that is the vehicle width direction, vibration or bending of the battery stacks in the front and rear direction of the vehicle can be effectively suppressed by the intervening member provided between the protruding portion and the front and rear walls of the casing. Therefore, even in a case where a collision external force is applied to both end portions of the battery stacks, collision interference of the battery stacks with the front and rear walls of the casing can be reduced.

In the in-vehicle battery pack according to the aspect, the intervening member may have seating portions that are in contact with the bottom surfaces of the battery stacks in central regions of the battery stacks in the stacking direction to support the battery stacks.

According to the configuration described above, since the central regions of the battery stacks in the stacking direction are supported by the seating portions of the intervening member, the resonance frequency of the battery stacks increases. As a result, resonance with respect to vehicle vibration can be effectively suppressed.

In the in-vehicle battery pack according to the aspect, the seating portions may be provided such that a gap is provided between the seating portions in a direction perpendicular to the stacking direction, and the seating portions may be in contact with both ends of the bottom surfaces of the battery stacks.

According to the configuration described above, since the seating portions provided with a gap therebetween are in contact with both ends of the bottom surfaces of the battery stacks, displacement or vibration of the battery stacks in the twist direction can be suppressed (refer to FIG. 7).

In the in-vehicle battery pack according to the aspect, an end portion of the intervening member may be disposed closer to the front and rear walls of the casing than to side surfaces of the battery stacks.

According to the configuration described above, when a collision external force is applied to the front and rear walls of the casing, at least a part of the collision external force is received by the intervening member or the protruding portion of the battery stack. As a result, the collision external force applied to the rear walls of the casing is reduced. Therefore, damage to the battery cells due to collision of the front and rear walls of the casing against the battery stack can be suppressed.

In the in-vehicle battery pack according to the aspect, the intervening member may be formed integrally with an air intake member that supplies the cooling air to a cooling flow path provided between the battery cells by the spacer member.

According to the configuration described above, since the intervening member and the air intake member are integrally formed, the intervening member for suppressing the vibration of the battery stacks or the like does not need to be specially provided. As a result, since the configuration can be simplified, assembling performance is improved.

The in-vehicle battery pack according to the aspect enables suppressing collision interference of the battery stacks with the front and rear walls of the casing when a collision external force is applied.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments will be described in detail with reference to the accompanying drawings. In the following description, specific shapes, materials, numerals, directions, and the like are examples, and can be appropriately changed according to use, purpose, specifications, and the like. In addition, in a case where a plurality of embodiments, modification examples, and the like are included below, it is assumed from the beginning that a combination of these configurations is appropriately used.

Hereinafter, an in-vehicle battery pack in which two battery stacks housed and fixed in a casing in two stages in the vertical direction will be described. However, the embodiment may also be applied to an in-vehicle battery pack in which one battery stack is housed and fixed in a casing.

Figure 1:
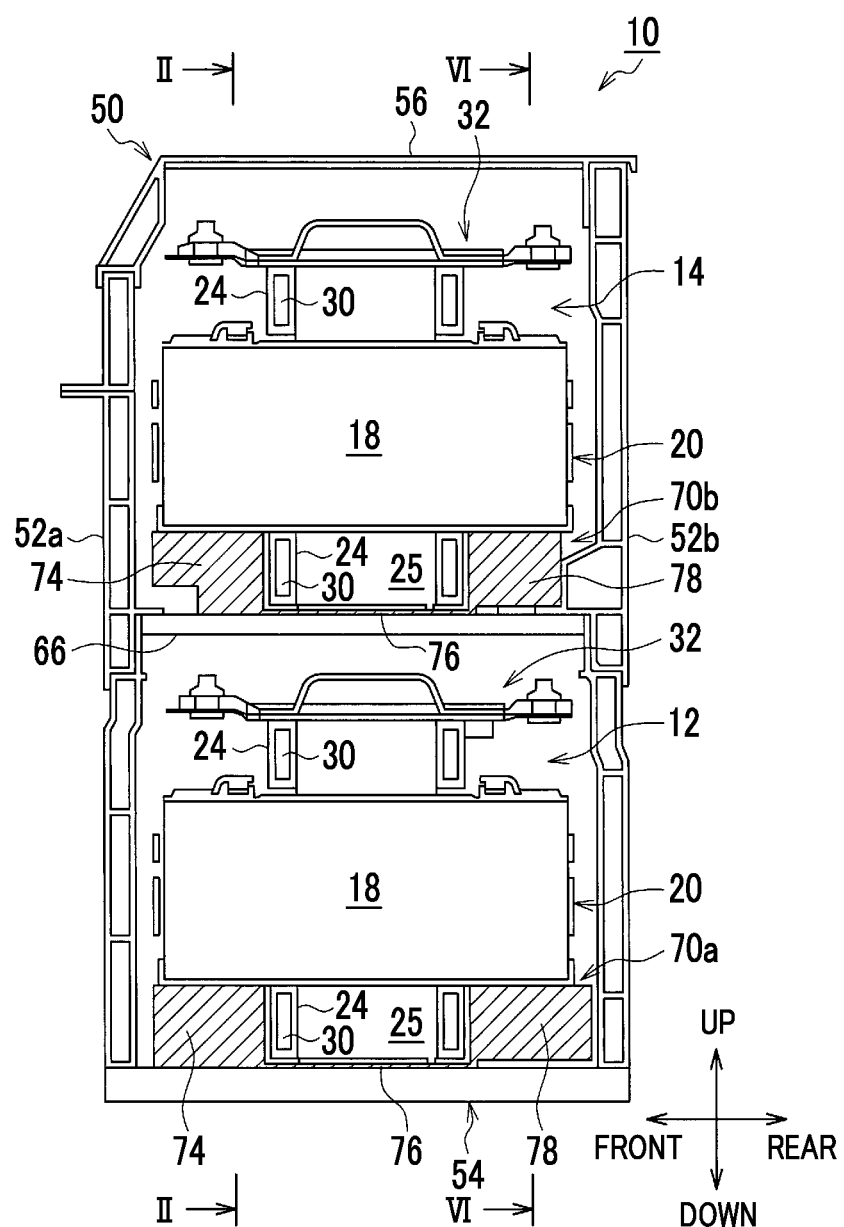
FIG. 1 is a cross-sectional view of an in-vehicle battery pack that is an embodiment.
Figure 2:
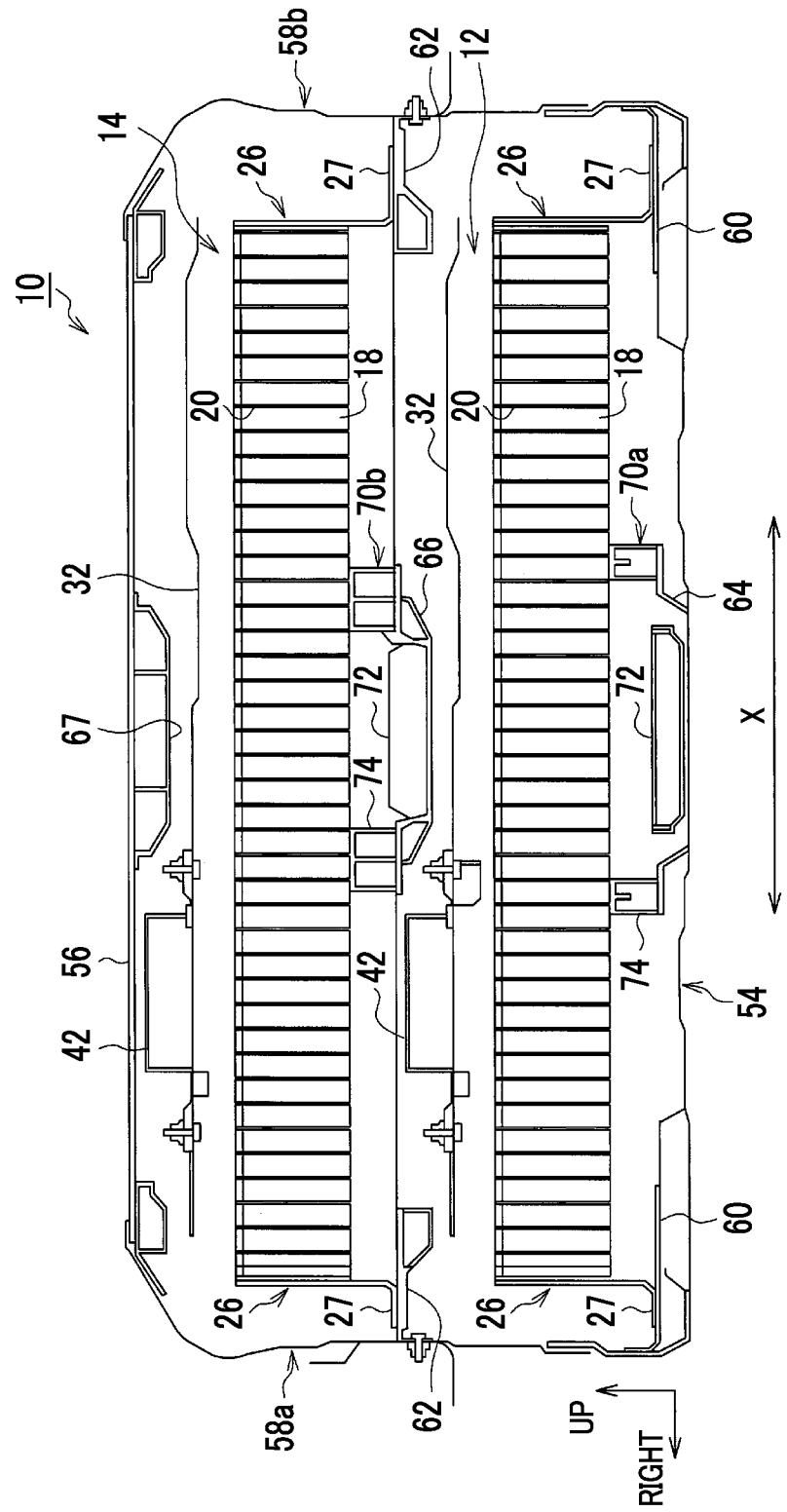
FIG. 2 is a cross-sectional view taken along the line II-II of FIG. 1.

FIG. 1 is a cross-sectional view of an in-vehicle battery pack (hereinafter, simply referred to as a "battery pack") 10 that is an embodiment. In FIG. 1, a vertical direction of a vehicle and a front and rear direction of the vehicle when the battery pack 10 is mounted so that the stacking direction of the battery cells 18 (depth direction of the page) is the same as the width direction of the vehicle are shown by arrows. In FIG. 2, an upper direction and a right direction of the vehicle are shown by arrows.

The battery pack 10 can be mounted in a hybrid vehicle, an electric vehicle, or the like, and can be used as a power source for supplying electric power to a motor that outputs power for traveling. The battery pack 10 may be provided at a position adjacent to a luggage room (or a trunk room) provided in the rear portion of the vehicle.

The battery pack 10 includes battery stacks 12, 14 disposed at two stages in the vertical direction and a casing 50 in which the battery stacks 12, 14 are housed. The battery stacks 12, 14 have the same configuration. Therefore, the battery stack 12 disposed at the lower stage will be described as an example, and the detailed description of the battery stack 14 disposed at the upper stage will be omitted.

As shown in FIG. 2, the battery stack 12 is formed by stacking a number of battery cells 18 in one direction. In the present embodiment, for example, a flat rectangular lithium ion battery is appropriately used as the battery cell 18. Hereinafter, a direction in which the battery cells 18 are stacked is referred to as a stacking direction X.

As shown in FIGS. 1 and 2, a spacer member 20 is interposed between the battery cells 18. The spacer member 20 is appropriately formed of, for example, an insulating resin member. The spacer member 20 electrically insulates the battery cells 18 from each other, and forms a cooling flow path 22 (refer to FIG. 5) between the battery cells 18. Exhaust ports or openings for exhausting the cooling air through the cooling flow path 22 of the spacer member 20 are formed on both side surfaces of the battery stack 12.

As shown in FIG. 1, in upper and lower portions of the spacer member 20, a pair of band insertion portions (protruding portions) 24 protrudes to be integrally formed. The band insertion portions 24 are provided with a predetermined gap therebetween. A space through which a binding band 30 is inserted is formed inside the band insertion portion 24.

As shown in FIG. 2, a pair of end plates 26 formed of, for example, a metal plate is disposed such that each of the end plates 26 is at each end of the battery stack 12 in the stacking direction X. The respective end plates 26 have two attachment portions 27, which are formed so as to be bent approximately in an L-shape, in lower portions of the end plates 26. A bolt insertion hole is formed in the attachment portion 27.

The binding band 30 is formed of, for example, a long strip-shaped metal plate. The binding band 30 presses or restrains a number of battery cells 18, which are stacked with the spacer member 20 interposed therebetween, with the end plates 26 to integrate the battery cells 18. The binding band 30 is inserted through each of the band insertion portions 24 formed in the upper and lower portions of the spacer member 20, and both end portions of the binding band 30 are fixed to the end plates 26 by welding or the like. As a result, the battery pack 10 is configured as an integral structure.

A device installation plate 32 is disposed above the battery stack 12. Both ends of the device installation plate 32 in the longitudinal direction (stacking direction X) are fixed to the upper portions of the end plates 26. As a result, on the top surface of the device installation plate 32, a device 42 is installed, for example, by screwing or the like. Examples of the device 42 include a voltage sensor for measuring the voltage of the battery stack 12, a current sensor for measuring the current of the battery stack 12, a temperature sensor for measuring the temperature of the battery stack 12, and a controller for monitoring the state of the battery stack 12 based on information from these sensors.

Next, the casing 50 in which the battery stacks 12, 14 are housed will be described. As shown in FIG. 1, the casing 50 includes a pair of front and rear walls 52a, 52b disposed along the stacking direction X of the battery cells 18 on both sides of the battery stacks 12, 14 in the front and rear direction of the vehicle, a bottom portion 54 fixed to lower portions of the front and rear walls 52a, 52b, and a ceiling portion 56 fixed to the upper portions of the front and rear walls 52a, 52b.

As shown in FIG. 2, the casing 50 further includes a pair of end walls 58a, 58b facing both ends of the battery stacks 12, 14 in the stacking direction X. Upper and lower portions of both the end walls 58a, 58b are fixed to the bottom portion 54 and the ceiling portion 56, and edge portions of both the end walls 58a, 58b in the front and rear direction of the vehicle are fixed to the front and rear walls 52a, 52b. As described above, the casing 50 is configured as an approximately rectangular parallelepiped casing by the side walls 52a, 52b, the bottom portion 54, the ceiling portion 56, and the end walls 58a, 58b.

As shown in FIG. 1, the front and rear walls 52a, 52b are formed of a plate material having a hollow structure, which is a metal material, such as an aluminum alloy, to secure strength and rigidity. By securing strength and rigidity, even in a case where a collision external force due to vehicle collision is applied to the front and rear walls 52a, 52b opposite each other in the front and rear direction of the vehicle, it is difficult for the front and rear walls 52a, 52b to be deformed. Therefore, the battery stacks 12, 14 housed in the casing 50 can be effectively protected.

As shown in FIG. 2, each of the end walls 58a, 58b of the casing 50 has a bottom end frame 60 and an upper end frame 62 protruding to the inside of the casing 50. Both end portions of the lower battery stack 12 are fixed to the bottom end frames 60 through the attachment portions 27 of the end plates 26. Both end portions of the upper battery stack 14 are fixed to the upper end frames 62 through the attachment portions 27 of the end plates 26.

As shown in FIGS. 1 and 2, the casing 50 has a bottom center frame 64 and an upper center frame 66 at positions corresponding to the centers of the battery stacks 12, 14 in the stacking direction X. Both end portions of the bottom center frame 64 and both end portions of the upper center frame 66 are fixed to inner walls of the front and rear walls 52a, 52b. By connecting the front and rear walls 52a, 52b to each other with the bottom center frame 64 and the upper center frame 66 as described above, the strength of the casing 50 is improved. Here, the bottom center frame 64 forms the bottom portion 54 for the lower battery stack 12 together with the bottom end frame 60. The upper center frame 66 forms a bottom portion for the upper battery stack 14 together with the upper end frame 62.

Figure 3:
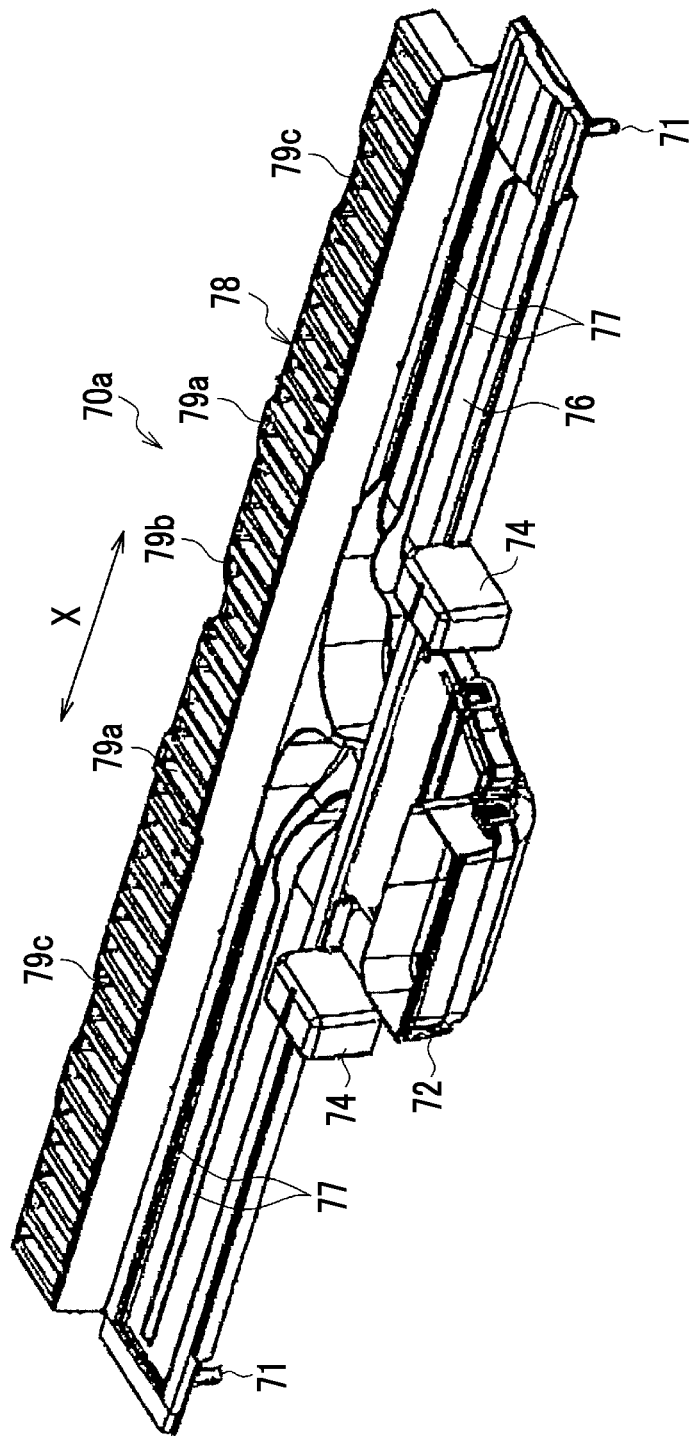
FIG. 3 is a perspective view showing a lower air intake tray included in the in-vehicle battery pack shown in FIG. 1.
Figure 4:
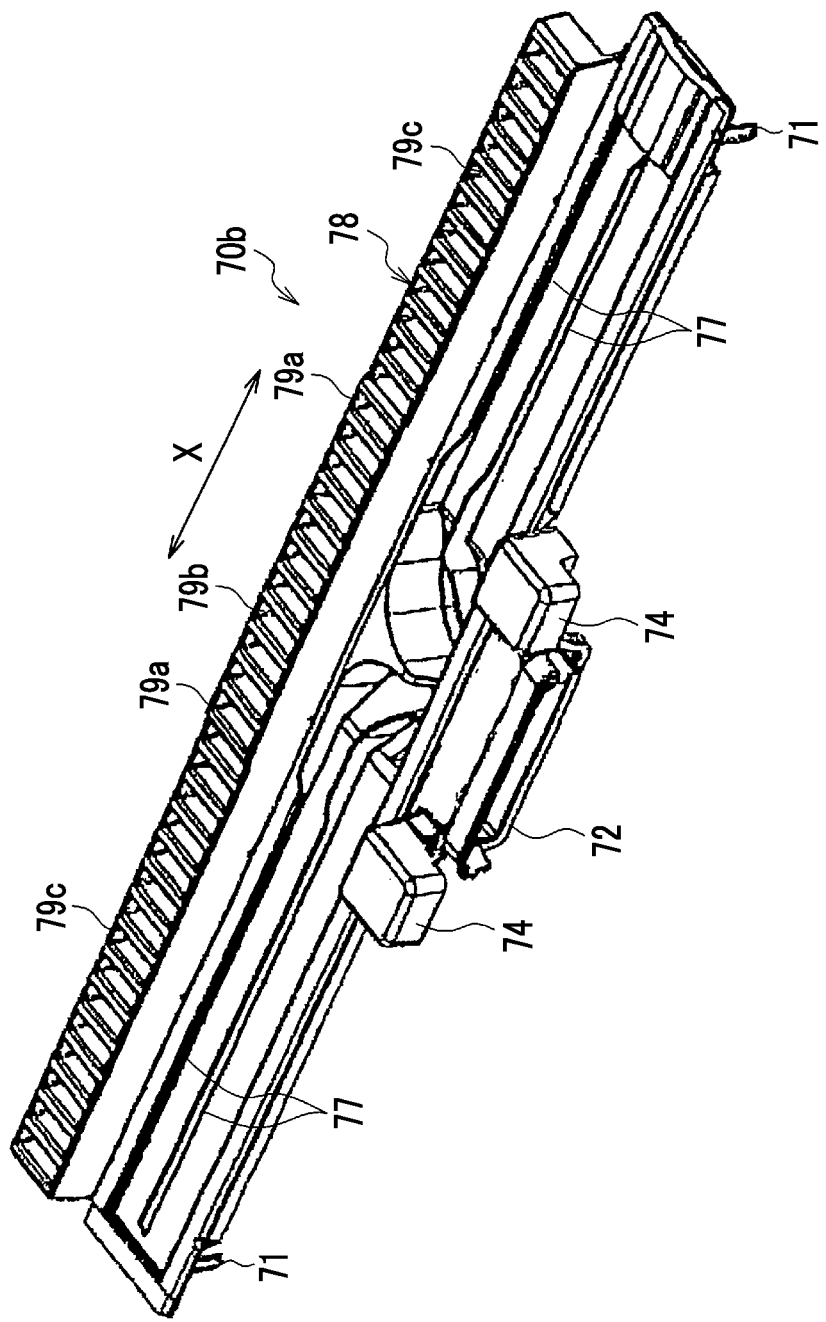
FIG. 4 is a perspective view showing an upper air intake tray included in the in-vehicle battery pack shown in FIG. 1.
Figure 5:
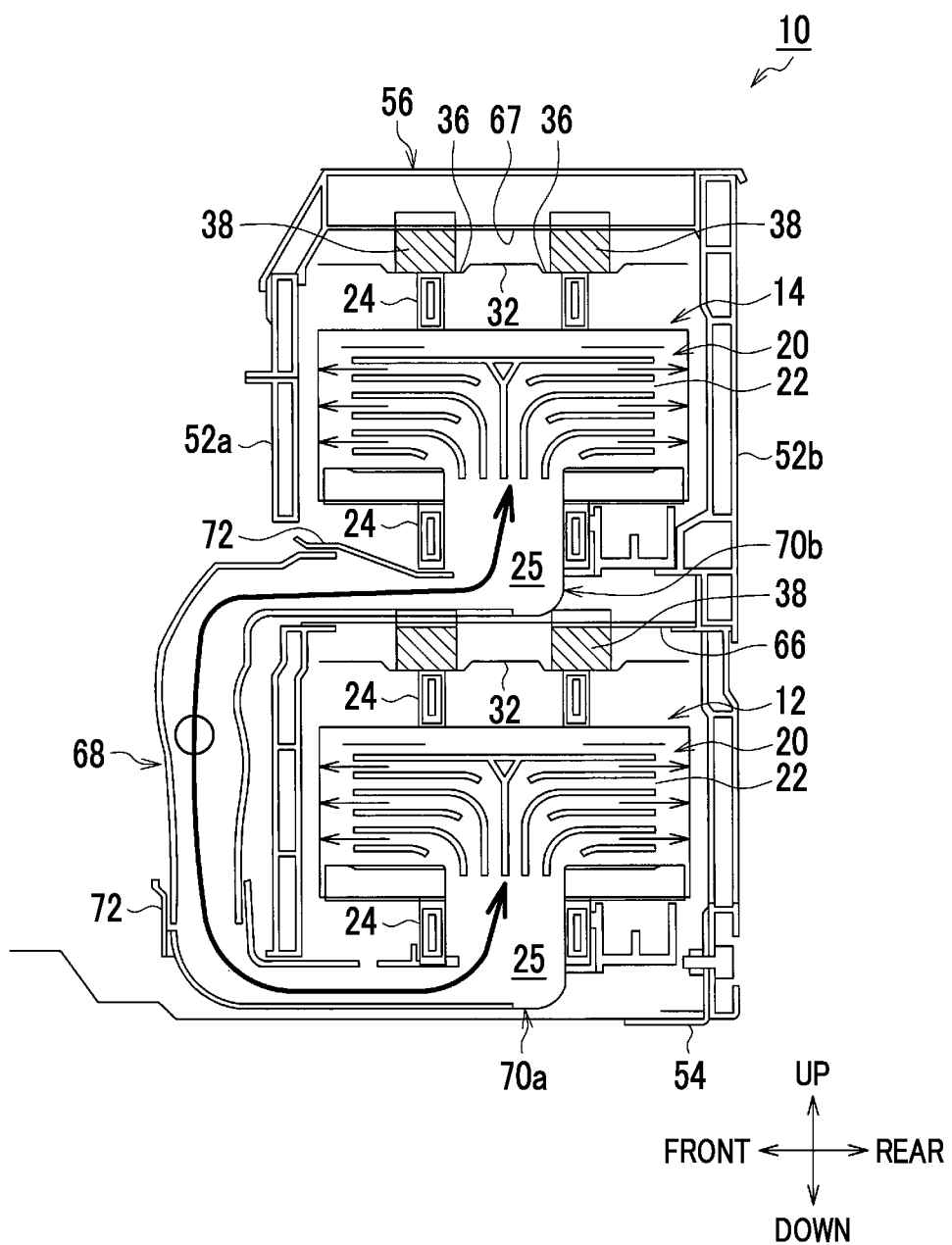
FIG. 5 is a diagram showing a cross-section when a battery pack is cut at positions of spacer members of battery stacks.
Figure 6:
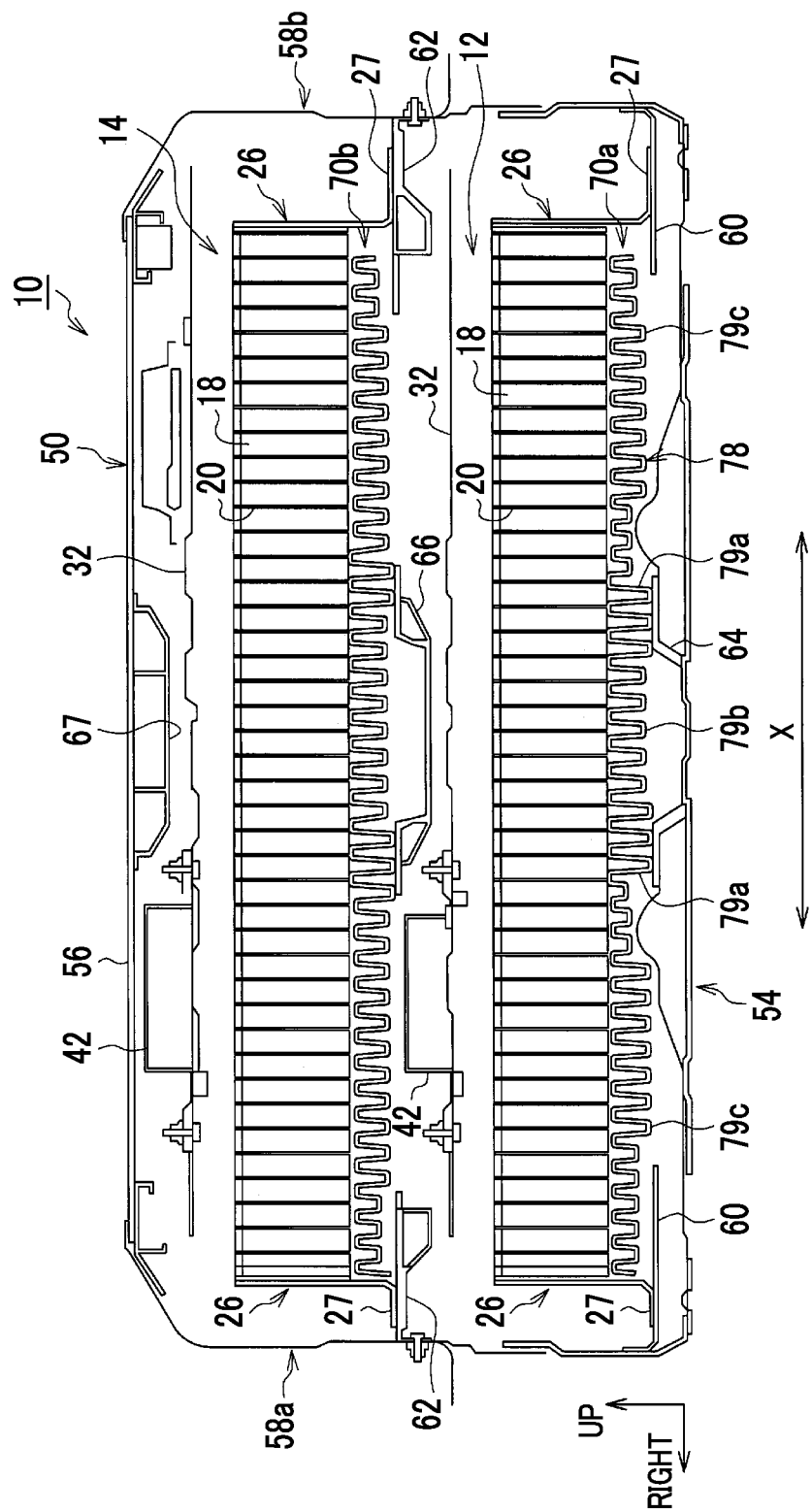
FIG. 6 is a cross-sectional view taken along the line VI-VI of FIG. 1.

Next, an air intake tray (air intake member) in the battery pack 10 of the present embodiment will be described with reference to FIGS. 3 and 4 as well as FIGS. 1 and 2. FIG. 3 is a perspective view showing a lower air intake tray 70a included in the battery pack 10. FIG. 4 is a perspective view showing an upper air intake tray 70b included in the battery pack 10. FIG. 5 is a diagram showing a cross-section when the battery pack 10 is cut at the positions of the spacer members 20 of the battery stacks 12, 14. FIG. 6 is a cross-sectional view taken along the line VI-VI of FIG. 1.

First, the lower air intake tray 70a will be described. As shown in FIG. 1, the lower air intake tray 70a is disposed between the lower battery stack 12 and the bottom portion 54 of the casing 50. As shown in FIG. 3, the lower air intake tray 70a has a duct portion 72 having a rectangular cylindrical shape, a pair of support portions 74 provided integrally on both sides of the duct portion 72, a flow path forming portion 76 formed integrally with the duct portion 72 and the support portions 74, and a corrugated plate portion (intervening member) 78 integrally formed with the flow path forming portion 76. The lower air intake tray 70a can be integrally formed of, for example, a resin material.

The duct portion 72 is provided corresponding to the center of the battery stack 12 in the stacking direction X. As shown in FIG. 5, when the battery pack 10 is assembled, the duct portion 72 is disposed so as to protrude to the front side of the vehicle from the front wall 52a that is one side wall, and a lower end portion of a duct member 68 is connected to the duct portion 72. As a result, the cooling air is sent into the battery pack 10 from the outside of the battery pack 10, thereby being supplied to the lower battery stack 12.

The support portions 74 are integrally provided with the duct portion 72 interposed therebetween. Each of the support portions 74 is formed in a rectangular parallelepiped shape, and protrudes upward. As shown in FIG. 2, the bottom surface of the support portion 74 is placed on the bottom center frame 64, so that the support portion 74 is supported. As shown in FIGS. 1 and 2, the top surface of the support portion 74 is in contact with a bottom surface on the front side of the vehicle, which is a central region of the battery stack 12 in the stacking direction X. As a result, the support portion 74 serves as a seating portion that supports the central region of the battery stack 12, in which the end plates 26 at both end portions of the support portion 74 are fixed to the bottom end frame 60, in a stretched state so as to press the central region of the battery stack 12 upward.

As shown in FIG. 3, the flow path forming portion 76 of the lower air intake tray 70a extends in an approximately rectangular shape along the stacking direction X of the battery stack 12. On the top surface of the flow path forming portion 76, a groove 77 for branching and flowing the cooling air sent from the duct portion 72 to both sides in the stacking direction X is formed.

As shown in FIG. 1, the flow path forming portion 76 is disposed so as to close a lower portion of the space between the band insertion portions 24 protruding from the bottom surface of the battery stack 12. As a result, an air intake chamber 25 is partitioned by the bottom surface of the battery stack 12, the band insertion portions 24, and the flow path forming portion 76.

As shown in FIG. 3, on the bottom surfaces of both ends of the flow path forming portion 76, positioning pins 71 are formed so as to protrude downward. The positioning pins 71 are inserted into positioning holes (not shown) formed in the bottom end frame 60 when the lower air intake tray 70a is assembled into the bottom portion 54 of the casing 50. As a result, the lower air intake tray 70a is accurately positioned and assembled. Thereafter, when the lower battery stack 12 is placed on the lower air intake tray 70a and both ends of the lower air intake tray 70a are fixed to the bottom end frame 60, the lower air intake tray 70a is interposed and fixed between the battery stack 12 and the bottom portion 54.

As shown in FIG. 5, the cooling air sent from the duct portion 72 flows through the cooling flow path 22, which is formed by the spacer members 20 between the battery cells 18, approximately in a T-shape through the air intake chamber 25. As a result, each battery cell 18 forming the battery stack 12 is cooled to a predetermined temperature range. Then, the cooling air is exhausted from the side surface of the battery stack 12 in the front and rear direction of the vehicle, and is discharged to the outside of the battery pack 10 through a gap or an opening provided in the casing 50.

Referring back to FIG. 3, the corrugated plate portion 78 formed integrally with the flow path forming portion 76 is formed so as to extend along the stacking direction X of the battery stack 12, and has approximately the same length as the battery stack 12. As shown in FIG. 6, the corrugated plate portion 78 is formed in a corrugated plate shape in which approximately trapezoidal protruding bent portions 79a, 79b, 79c are continuous. By forming the corrugated plate portion 78 as described above, the strength of the corrugated plate portion 78 can be increased while reducing the amount of resin material used. However, instead of the corrugated plate portion 78, a flat plate portion or the like having a thickness ensuring a predetermined strength may be used as an intervening member.

As shown in FIG. 6, bottom surfaces of a plurality of protruding bent portions 79a located in the central region of the battery stack 12 in the stacking direction X, among the protruding bent portions 79a, 79b, 79c forming the corrugated plate portion 78, are placed on the bottom center frame 64, so that the protruding bent portions 79a are supported. The top surface of the protruding bent portion 79a is in contact with a bottom surface on the rear side of the vehicle, which is a central region of the battery stack 12 in the stacking direction X. As a result, the protruding bent portion 79a serves as a seating portion that supports the central region of the battery stack 12 in the stacking direction X so that the central region of the battery stack 12 is pressed upward. The bottom surface of the protruding bent portion 79b located between the protruding bent portions 79a placed on the bottom center frame 64 is not placed on the bottom center frame 64, but the top surface of the protruding bent portion 79b is in contact with the bottom surface of the battery stack 12. On the other hand, the protruding bent portion 79c located closer to the end portion side of the battery stack 12 in the stacking direction X than the protruding bent portion 79a is separated from the bottom surface of the battery stack 12.

As described above, since the corrugated plate portion 78 has the seating portion that supports the central region of the battery stack 12 in the stacking direction X, the battery stack 12 is supported in a stretched state so as to press the central region of the battery stack 12 upward, in which the end plates 26 at both end portions are fixed to the bottom end frame 60, not only by the support portion 74 of the lower air intake tray 70a described above but also by the protruding bent portion 79a of the corrugated plate portion 78.

Figure 7:
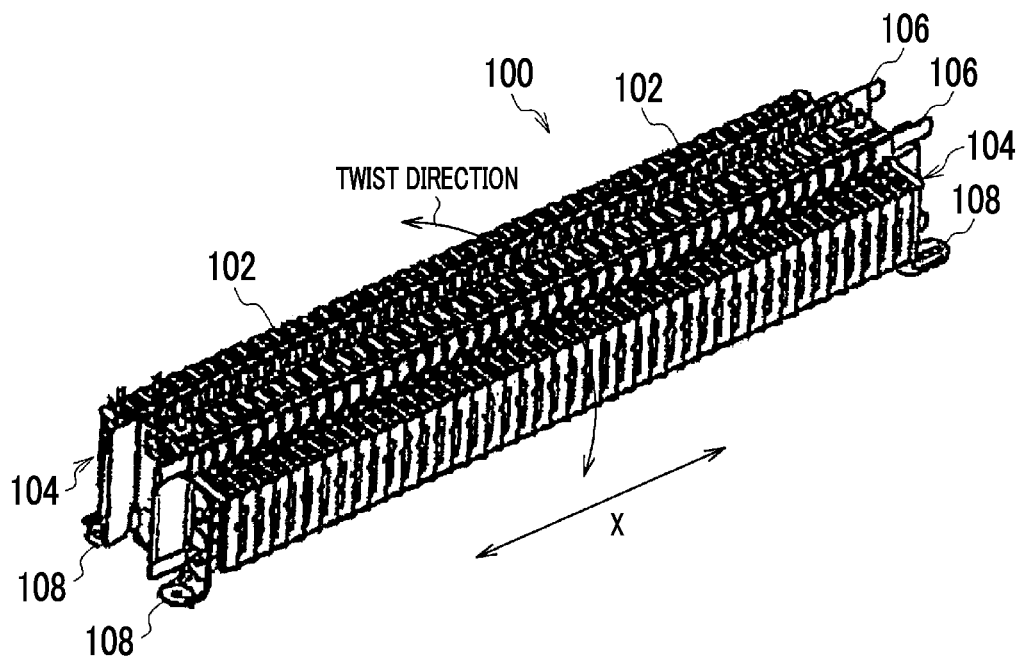
FIG. 7 is a perspective view of a battery stack.
Figure 8:
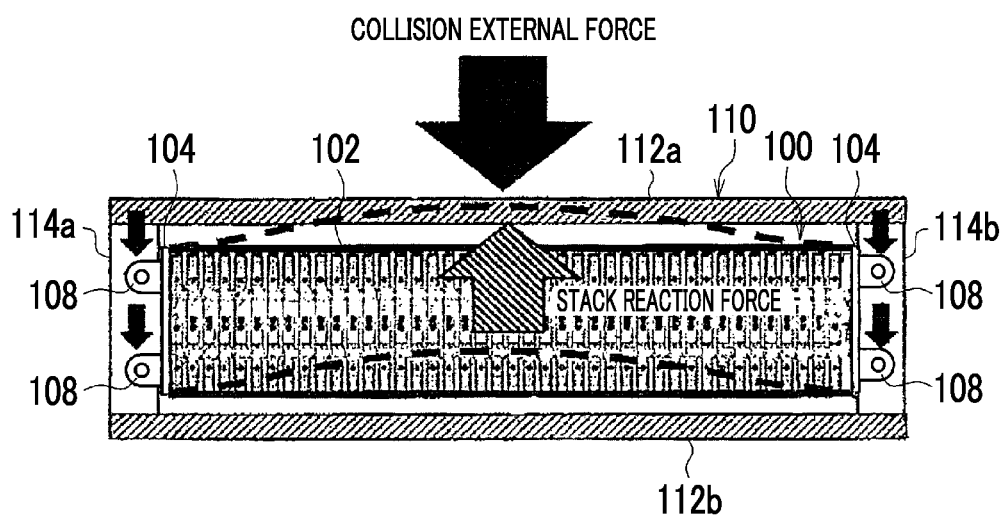
FIG. 8 is a diagram showing an example of a battery pack in the related art.

In this case, in the battery pack 10 of the present embodiment, the support portion 74 is in contact with an end portion of the bottom surface of the battery stack 12 on the front side of the vehicle, and the protruding bent portion 79a of the corrugated plate portion 78 is in contact with an end portion of the bottom surface of the battery stack 12 on the rear side of the vehicle. As described above, since the battery stack 12 is supported by the support portion 74 and the protruding bent portion 79a that are disposed with a gap therebetween in a direction perpendicular to the stacking direction X, displacement of the battery stack 12 in a twist direction (refer to FIG. 7) can be effectively suppressed.

As shown in FIG. 1, the corrugated plate portion 78 is provided between the bottom surface of the battery stack 12 and the bottom portion 54 of the casing 50, and serves as an intervening member disposed between the band insertion portions 24 on the rear side of the vehicle, which protrudes to the bottom surface of the battery stack 12, and the rear wall 52b of the casing 50. By interposing the corrugated plate portion 78 as described above, it is possible to effectively suppress the central region of the battery stack 12 in the stacking direction X from bending or vibrating in the front and rear direction of the vehicle. Therefore, even in a case where a collision external force is applied to both ends of the battery stack 12 through the attachment portions 27 of the end plates 26, collision interference of the battery stack 12 with the rear wall 52b of the casing 50 can be suppressed.

As shown in FIG. 1, an end portion of the corrugated plate portion 78 on the rear side of the vehicle is disposed closer to the rear wall 52b of the casing 50 than to the side surface of the battery stack 12. Specifically, the gap between the corrugated plate portion 78 and the rear wall 52b is set to 2 mm, and the gap between the battery stack 12 and the rear wall 52b is set to 7 mm, for example. Since the corrugated plate portion 78 is disposed closer to the rear wall 52b than to the battery stack 12 as described above, at least a part of the collision external force applied to the rear wall 52b of the casing 50 is received by the corrugated plate portion 78 or the band insertion portion 24 of the battery stack 12. As a result, the collision external force applied to the rear wall 52b of the casing 50 is reduced. Therefore, damage to the battery cells 18 due to collision of the rear wall 52b of the casing 50 against the battery stack 12 can On the other hand, as shown in FIGS. 1 and 2, the upper air intake tray 70b is an air intake member for supplying the cooling air to the upper battery stack 14. Both ends of the upper air intake tray 70b in the stacking direction X are interposed and fixed between the end plates 26 of the battery stack 14 and the upper end frame 62. In the central region of the upper air intake tray 70b in the stacking direction X, the support portion 74 and the protruding bent portion 79a of the corrugated plate portion 78 are interposed and fixed between the battery stack 14 and the upper center frame 66.

As shown in FIG. 5, the upper air intake tray 70b is different from the lower air intake tray 70a in that the duct portion 72 of the upper air intake tray 70b is located on the inner side of the front wall 52a and the upper end portion of the duct member 68 is inserted into the casing 50 to be connected thereto. Since the other configurations of the upper air intake tray 70b are the same as those of the lower air intake tray 70a described above, the same configurations are denoted by the same reference numerals, and the detailed description thereof will be omitted.

As shown in FIG. 5, two elastic members 38 formed of, for example, rubber, urethane foam, or a spring are provided at positions corresponding to the central region of the lower battery stack 12 in the stacking direction X. Each of the elastic members 38 is disposed in a recessed portion 36 formed on the top surface of the device installation plate 32 so as to be interposed between the device installation plate 32 and the upper center frame 66. The bottom surface of the recessed portion 36 of the device installation plate 32 is in contact with the two band insertion portions 24 protruding to the top surface of the battery stack 12. As a result, the battery stack 12 is pressed downward through the band insertion portions 24 by the elastic members 38. Such pressing is the same for the upper battery stack 14. That is, the battery stack 14 is pressed downward through the band insertion portions 24 by the elastic members 38 interposed between the device installation plate 32 and a ceiling center frame 67.

As described above, with the battery pack 10 of the present embodiment, for the lower battery stack 12, the corrugated plate portion 78 of the lower air intake tray 70a is provided between the bottom surface of the battery stack 12 and the bottom portion 54 of the casing 50 so as to be interposed between the band insertion portions 24 on the rear side of the vehicle protruding to the bottom surface of the battery stack 12 and the rear wall 52b of the casing 50. In addition, for the upper battery stack 14, the corrugated plate portion 78 of the upper air intake tray 70b is provided between the bottom surface of the battery stack 14 and the upper end frame 62 and the upper center frame 66 of the casing 50 so as to be interposed between the band insertion portions 24 on the rear side of the vehicle protruding to the bottom surface of the battery stack 14 and the rear wall 52b of the casing 50. By interposing the corrugated plate portion 78 as described above, it is possible to effectively suppress the central regions of the battery stacks 12, 14 in the stacking direction X from bending or vibrating in the front and rear direction of the vehicle. Therefore, even in a case where a collision external force is applied to both ends of the battery stacks 12, 14 through the attachment portions 27 of the end plates 26, collision interference of the battery stacks 12, 14 with the rear wall 52b of the casing 50 can be reduced.

In the battery pack 10 of the present embodiment, the central regions of the battery stacks 12, 14 in the stacking direction X are supported in a state pressed upward by the support portion 74 and the corrugated plate portion 78 of the lower air intake tray 70a and the upper air intake tray 70b. Since the central regions of the battery stacks 12, 14 in the stacking direction X are supported as described above, the resonance frequency of the battery stacks 12, 14 increases, for example, from 30 Hz to 70 Hz, compared with a case where only the two ends in the stacking direction X are fixed to the casing 50. As a result, resonance with respect to vehicle vibration can be effectively suppressed.

In the battery pack 10 of the present embodiment, the upper portion of the central region of the battery stack 12 in the stacking direction X is pressed downward through the device installation plate 32 by the elastic member 38. For the battery stack 14, the upper portion of the central region in the stacking direction X is pressed downward through the device installation plate 32 by the elastic member 38. Therefore, since the central regions of the battery stacks 12, 14 in the stacking direction X are pressed and supported from both the upper and lower sides, resonance with respect to vehicle vibration can be more effectively suppressed by a further increase in the resonance frequency.

The disclosure is not limited to the above-described embodiment and modifications thereof, and various modifications and improvements can be made within the scope of claims set forth in the claims of the present application and equivalents thereto.

For example, the case where a protruding portion that protrudes to the bottom surfaces of the battery stacks 12, 14 is one band insertion portion 24 has been described above, the disclosure is not limited thereto, and other protruding portions that protrude from the spacer member 20 formed of resin may be used.

In the above, an example has been described in which the corrugated plate portion 78 serving as an intervening member is formed integrally with the air intake trays 70a, 70b. However, the intervening member may be formed as a member different from the air intake trays 70a, 70b.

In the above, an example has been described in which the elastic member 38 for pressing and supporting the battery stacks 12, 14 from the upper side is provided. However, the elastic member 38 can be omitted.

What is claimed is:

1. An in-vehicle battery pack comprising:
battery stacks in which a plurality of battery cells is stacked, each of the battery stacks including two end portions respectively provided at ends of the battery stack in the stacking direction;
a plurality of spacer members, each spacer member respectively interposed between each pair of immediately adjacent battery cells;
a casing in which the battery stacks are housed, the casing includes at least a pair of walls, a bottom portion, and a ceiling portion; the pair of walls including a front wall disposed on a front side of the battery stacks along a stacking direction of the battery cells and a rear wall disposed on a rear side of the battery stacks along the stacking direction of the battery cells, the bottom portion fixed to lower portions of the front wall and the rear wall, and the ceiling portion fixed to upper portions of the front wall and the rear wall, and each of the end portions of a lowermost battery stack of the plurality of battery stacks is fixed to the bottom portion; and
an intervening member that is provided between the lowermost battery stack and the bottom portion of the casing
wherein the intervening member includes a support portion and a corrugated plate portion, the corrugated plate portion includes protruding bent portions, the support portion serves as a seating portion that supports a central region in the stacking direction of the lowermost battery stack at a location toward a front side of a vehicle, and the protruding bent portions serve as a seating portion that supports the central region of the battery stacks at a location toward a rear side of the vehicle;
wherein the support portion is interposed between a first protruding portion and the front wall of the casing: and the corrugated plate portion is interposed between a second protruding portion and the rear wall of the casing, each of the first and second protruding portions is a part of one of the plurality of the spacer members protruding to a bottom surface of the lowermost battery stack;

wherein the seating portions are in contact with the bottom surface of the lowermost battery stack in the central region of the lowermost battery stack whereby the intervening member supports the lowermost battery stack; and wherein a gap is provided between the support portion and the corrugated plate portion in a direction perpendicular to the stacking direction, the support portion is in contact with a front end of the bottom surface of the lowermost battery stack: and the corrugated plate portion is in contact with a rear end of the bottom surface of the lowermost battery stack.

2. The in-vehicle battery pack according to claim 1, wherein an end portion of the intervening member is disposed closer to the front or rear walls of the casing than the corresponding front and rear to side surfaces of the lowermost battery stack.

3. The in-vehicle battery pack according to claim 1, wherein the intervening member is formed integrally with an air intake member that supplies cooling air to a cooling flow path provided between the battery cells by the spacer member.

* * * * *